US011126521B2

(12) United States Patent
Liao et al.

(10) Patent No.: US 11,126,521 B2
(45) Date of Patent: Sep. 21, 2021

(54) METHOD AND SYSTEM FOR INDICATING BIOS POST STATUS FROM STORAGE DRIVE LED

(71) Applicant: Quanta Computer Inc., Taoyuan (TW)

(72) Inventors: Yu-Hsien Liao, Taoyuan (TW); Han-Chuan Tsai, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 31 days.

(21) Appl. No.: 16/727,603

(22) Filed: Dec. 26, 2019

(65) Prior Publication Data
US 2021/0200652 A1 Jul. 1, 2021

(51) Int. Cl.
G06F 11/00 (2006.01)
G06F 11/273 (2006.01)
G06F 13/36 (2006.01)
G06F 11/22 (2006.01)

(52) U.S. Cl.
CPC ........ G06F 11/273 (2013.01); G06F 11/2284 (2013.01); G06F 13/36 (2013.01)

(58) Field of Classification Search
CPC ............... G06F 11/273; G06F 11/2284; G06F 11/2278; G06F 11/321; G06F 11/324; G06F 11/325; G06F 11/328; G06F 13/36
See application file for complete search history.

(56) References Cited

U.S. PATENT DOCUMENTS

| 5,646,535 A * | 7/1997 | Dornier | G06F 11/22 324/133 |
| 2005/0251705 A1* | 11/2005 | Liu | G06F 11/3636 714/48 |
| 2007/0234132 A1* | 10/2007 | Lee | G06F 11/325 714/57 |
| 2009/0259888 A1* | 10/2009 | Gao | G06F 11/2284 714/30 |
| 2013/0238937 A1* | 9/2013 | Tu | G06F 11/326 714/36 |
| 2015/0242357 A1* | 8/2015 | Pancholi | G06F 11/2247 710/13 |
| 2016/0116961 A1* | 4/2016 | Ragupathi | G06F 1/32 713/320 |
| 2017/0083457 A1* | 3/2017 | Khemani | G06F 12/1408 |
| 2020/0073773 A1* | 3/2020 | Liu | G06F 11/0772 |

* cited by examiner

Primary Examiner — Joseph D Manoskey
(74) Attorney, Agent, or Firm — Nixon Peabody LLP

(57) ABSTRACT

A system and method for providing a status indicator during a power-on self-test routine. A basic input output system is operable to execute the power-on self-test routine and output a status of the power-on self-test routine. A plurality of storage devices that each have an externally visible indicator. A controller is coupled to the basic input output system and the plurality of storage devices. The controller is operable to receive the status from the basic input output system and control the externally visible indicator of each of the storage devices in response to the status received from the basic input output system.

18 Claims, 3 Drawing Sheets

METHOD AND SYSTEM FOR INDICATING BIOS POST STATUS FROM STORAGE DRIVE LED

TECHNICAL FIELD

The present disclosure relates generally to status indicators for power-up routines for computing devices. More particularly, aspects of this disclosure relate to a configuration of LEDs from storage devices to indicate BIOS POST status.

BACKGROUND

Servers are employed in large numbers for high demand applications such as network based systems or data centers. The emergence of the cloud for computing applications has increased the demand for data centers. Data centers have numerous servers that store data and run applications accessed by remotely connected computer device users. A typical data center has physical chassis structures with attendant power and communication connections. Each rack may hold multiple computing servers and storage servers. Each individual server is typically powered-up with a power-on self-test (POST) routine to begin operation. During a POST routine for a computer system, such as a processor core on a server, the basic input output system (BIOS) may provide status codes to an external controller, such as a baseboard management controller (BMC). Delays in powering-up servers are undesirable, as any delay increases the time a user must wait to complete tasks such as data processing or application execution. Such delays multiplied over the large numbers of servers in a data center can impede overall operation of the data center.

In the typical design of modern server, a user is unable to determine the current BIOS POST progress status. Although many circuit boards include a BIOS POST LED that lights up when the POST routine is in process, this LED is currently contained within the interior of the server chassis. Thus, a user cannot determine whether the server is booting up successfully or freezing while booting. Compared to the BIOS POST LED, typically a status LED or LEDs for storage devices such as hard disk drives (HDD) are designed in front of the device. Such devices are typically mounted in a server chassis and the LEDs are visible on the exterior of the server. For example, a hard drive activity light—sometimes referred to as an HDD LED, a hard drive light, or a hard drive activity indicator—is a small LED light that illuminates whenever the hard drive or other built-in storage is plugged in and connected to the server. However, such LEDs do not currently indicate the status of the boot-up process.

Thus, there is a need for a system that provides an externally visible LED on a hard disk drive to indicate the BIOS POST routine status. There is another need for a system that provides an easy way to display the BIOS POST stage status without any hardware modification to existing server hardware. There is also a need for a system that allows a user to read a POST status code to identify errors in the BIOS POST stage for troubleshooting.

SUMMARY

One disclosed example is a system for providing a status indicator during a power-on self-test routine. The system includes a basic input output system operable to execute the power-on self-test routine and output a status of the power-on self-test routine. The system includes a plurality of storage devices. Each of the storage devices has an externally visible indicator. The system includes a controller coupled to the basic input output system and the plurality of storage devices. The controller is operable to receive the status from the basic input output system and to control the externally visible indicator of each of the plurality of storage devices in response to the status received from the basic input output system.

In other implementations of the disclosed example system, the controller is a baseboard management controller. In another implementation, the externally visible indicator is an LED. In another implementation, the modular device is one a plurality of modular devices. In another implementation, the status is a power on self-test (POST) code. In an alternative implementation, the plurality of modular devices comprises eight modular devices, the POST code is an 8-bit code, and the controller is operable to present the POST code using the externally visible indicators of the eight modular devices. In an alternative implementation, the POST code is selected from a plurality of codes representing different information associated with the status of the power-on self-test routine. In an alternative implementation, the externally visible indicator indicates a function of the modular device, and the controller is operable to override the modular device during the power-on self-test routine and return control to the modular device when the power-on self-test routine is complete. In an alternative implementation, the modular device is a storage device.

Another disclosed example is a method of providing a status indicator from a power-on self-test routine executed by a basic input output system on a plurality of externally visible indicators on respective storage devices. The power-on self-test routine is performed via the basic input output system. A status of the power-on self-test routine is provided. The visible indicator of the modular device is controlled according to the status of the power-on self-test routine.

In other implementations of the disclosed example method, the controller is a baseboard management controller. In another implementation, the externally visible indicator is an LED. In another implementation, the modular device is one a plurality of modular devices. In another implementation, the status is a power on self-test (POST) code. In an alternative implementation, the plurality of modular devices comprises eight modular devices, the POST code is an 8-bit code, and the controller is operable to present the POST code using the externally visible indicators of the eight modular devices. In an alternative implementation, the POST code is selected from a plurality of codes representing different information associated with the status of the power-on self-test routine. In an alternative implementation, the externally visible indicator indicates a function of the modular device, and the controller is operable to override the modular device during the power-on self-test routine and return control to the modular device when the power-on self-test routine is complete. In an alternative implementation, the modular device is a storage device.

Another disclosed example is a server having a chassis with an external panel. The server includes a basic input output system operable to execute the power-on self-test routine and output a code associated with the status of the power-on self-test routine. The server also includes a plurality of storage devices. Each of the storage devices has an externally visible indicator. A controller is coupled to the basic input output system and the plurality of storage devices. The controller is operable to receive the code from the basic input output system and to control the externally visible indicators of the plurality of storage devices in response to the code received from the basic input output system. An alternative is where the modular devices are storage devices.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
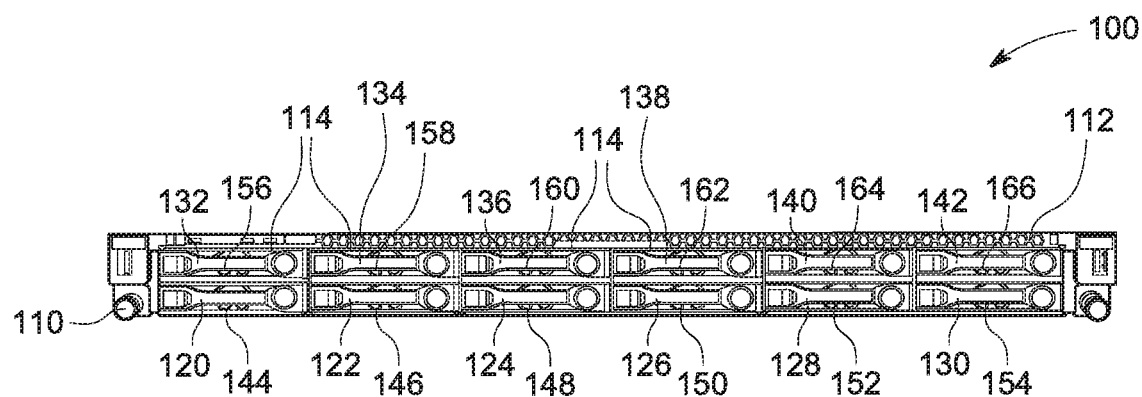
FIG. 1 is a view of a front panel of an example server showing LEDs mounted on storage devices in the server chassis that may be used to indicate BIOS POST status, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a boot system that uses visual indicators, such as LEDs on hard disk drives (HDDs), that may be viewed on an external panel of a computer component such as a server. The visual indicators are used to identify the boot status of a POST routine of an internal component such as the BIOS. Multiple externally visible LEDs may be used to present the BIOS status in the form of a BIOS POST code. The disclosed method provides an easy way to display the BIOS POST stage status without any hardware modification. The displayed POST stage code on the externally visible LEDs may inform a user that the system on the server is working normally. Further, the code on the LEDs may inform a user of any issues causing the BIOS to be stuck on a POST stage. The POST stage code may also help a user or developer to identify errors and perform troubleshooting of the system.

FIG. 1 is a view of a front panel of an example server 100 showing LEDs mounted on storage devices in the server chassis that may be used to indicate BIOS POST status, according to certain aspects of the present disclosure. The server 100 includes a chassis 110 with an externally visible front panel 112 and an opposite externally visible back panel (not shown). The chassis 110 includes slots 114 that hold slot cases of different modular devices that may be inserted in the slots 114. In this example, the modular devices are storage devices such as hard disk drives 120, 122, 124, 126, 128, 130, 132, 134, 136, 138, 140 and 142. Each of the slot cases of the hard disk drives, such as the hard disk drive 120, includes different status LEDs such as a HDD present LED 144. Thus, HDD present LEDs 144, 146, 148, 150, 152, 154, 156, 158, 160, 162, 164 and 166 are located on the slot cases of the respective hard disk drives 120, 122, 124, 126, 128, 130, 132, 134, 136, 138, 140 and 142. Other LEDs, such as a fault LED or an IO LED, may also be mounted on the respective hard disk drives. Each of such LEDs normally indicates different operations of the hard disk drive. In this example, the HDD present LEDs 144, 146, 148, 150, 152, 154, 156, 158, 160, 162, 164 and 166, of each of the hard disk drives 120, 122, 124, 126, 128, 130, 132, 134, 136, 138, 140 and 142, indicate whether the respective hard disk drive is plugged into the server 100. An internal controller for each of the respective hard disk drives 120, 122, 124, 126, 128, 130, 132, 134, 136, 138, 140 and 142 typically powers the respective LEDs 144, 146, 148, 150, 152, 154, 156, 158, 160, 162, 164 and 166 based on the operational status of the hard disk drive. In this example, the LEDs 144, 146, 148, 150, 156, 158, 160, and 162 also display the progress status of the BIOS boot-up process during the power-up sequence of the server 100.

In some cases, other LEDs (e.g., fault LED, IO LED, or other LEDs) can be used to display the progress status of the BIOS boot-up process during the power-up sequence of the server 100, in addition to or instead of LEDs 144, 146, 148, 150, 156, 158, 160, and 162. In some cases, when a HDD uses an indicator device other than an LED (e.g., incandescent lamps, electroluminescent panels, or other indicators) to present information about the HDD, such indicator devices can be can be used in place of LEDs, as disclosed herein, to present information about the BIOS POST status.

Figure 2:
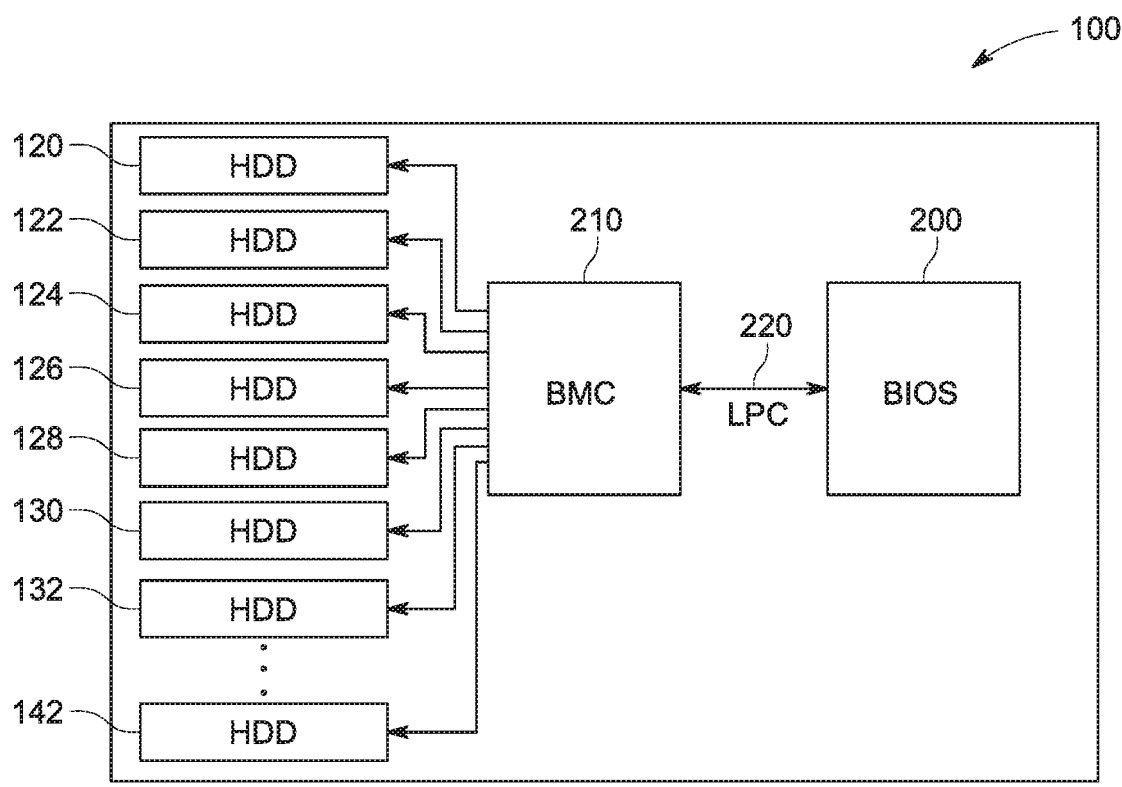
FIG. 2 is a block diagram of the components of the example server in FIG. 1.

FIG. 2 is a block diagram of the server 100 of FIG. 1. The server 100 includes a BIOS chip 200 and a baseboard memory controller (BMC) 210. The BMC 210 is coupled to the BIOS chip 200 via low pin count (LPC) bus 220. The BIOS chip 200 executes the BIOS when the server 100 is powered-up. The BMC 210 receives post routine status from the BIOS executed by the BIOS chip 200. As described herein, the BMC 210 may override the internal controllers on the hard disk drives 120, 122, 124, 126, 128, 130, 132, 134, 136, 138, 140 and 142 (in FIG. 1) and operate the respective present LEDs 144, 146, 148, 150, 152, 154, 156, 158, 160, 162, 164 and 166 (also in FIG. 1). In this example, the lighting of the LEDs 144, 146, 148, 150, 156, 158, 160, and 162 during the BIOS POST process is sequenced by a routine on the BMC 210. Of course, greater or fewer LEDs may be used instead of the eight LEDs used in this example.

In this example, a BIOS POST status code output by the BIOS chip 200 is an 8-bit binary code. The BIOS POST status code is used to present the progress status of the BIOS processing stage when the system of the server 100 is booting-up. It is to be understood that the drive slot case of each hard disk drive usually contains several LED lights such as a present LED, a fault LED, or an I0 LED. The disclosed method uses some or all of the externally visible indicators on the hard disk drives such as the present LEDs 144, 146, 148, 150, 152, 154, 156, 158, 160, 162, 164 and 166 on the hard disk drives 120, 122, 124, 126, 128, 130, 132, 134, 136, 138, 140 and 142 to display the BIOS POST status code. Other LEDs on the hard disk drives such as the fault LED or I0 LED may be used to display the BIOS POST status code. In this example, the present LEDs of eight hard drives are used to display the BIOS POST status code because the example BIOS POST code is an 8-bit binary code. In other examples, if there are more hard disk drives, other code protocols may be displayed, such as a code protocol having two hexadecimal characters that would require 16 hard disk drives and corresponding LEDs.

In some cases, a BIOS POST code can be translated, grouped, or otherwise modified to be displayed on a given number of LEDs. In some cases, it may be acceptable or desirable to present a modified version of a BIOS POST code with less information value (e.g., the various options available in an 8-bit code being grouped together so they can be output using fewer than eight LEDs) if it permits that modified version of the BIOS POST code to be viewed easily using the LEDs associated with a set of HDDs.

When the system is booting, the BIOS on the BIOS chip 200 starts to run and sends the POST status code to the BMC 210. If the BMC 210 receives a BIOS POST start message, it will switch the LED controller on the required hard drives 120, 122, 124, 126, 132, 134, 136, and 138 to manual control mode. The BMC 210 does this for eight of the hard drives 120, 122, 124, 126, 132, 134, 136, and 138 needed to display the BIOS POST code in this example, but it is to be understood the BMC 210 can switch to manual control mode as many hard drives as necessary to display the code. In some cases, manual control mode can be used with more hard drives than necessary to display the code to improve visual distinction of the code, such as by keeping the LEDs on the extra hard drives dark. The manual control mode allows the BMC 210 to control the powering of the respective present LEDs 144, 146, 148, 150, 156, 158, 160 and 162 in this example. In this situation, each of the HDD present LEDs of the hard disk drives are not lit up by a present status of the respective hard disk drive. Instead, the BMC 210 controls the HDD present LEDs 144, 146, 148, 150, 156, 158, 160 and 162. The BMC 210 will light the LEDs 144, 146, 148, 150, 156, 158, 160 and 162 depending on the BIOS POST code received by the BMC 210 from the BIOS chip 200. In this example, the BMC 210 lights the LEDs 144, 146, 148, 150, 156, 158, 160 and 162 to map the current BIOS POST code until the BMC 210 receives the POST end signal. Thus, a user may view the LEDs 144, 146, 148, 150, 156, 158, 160 and 162 and determine the status of the boot-up process. If the system of the server 100 takes a long time to boot-up or is hung up, a user may identify the POST status from the LEDs 144, 146, 148, 150, 156, 158, 160 and 162 and quickly take appropriate corrective action. When the BMC 210 receives the BIOS POST end message, the BMC 210 will return control of the LEDs 144, 146, 148, 150, 156, 158, 160 and 162 to the controllers of the respective hard drives and end the process. The LEDs 144, 146, 148, 150, 156, 158, 160 and 162 will thus return to their normal function.

Figure 3:
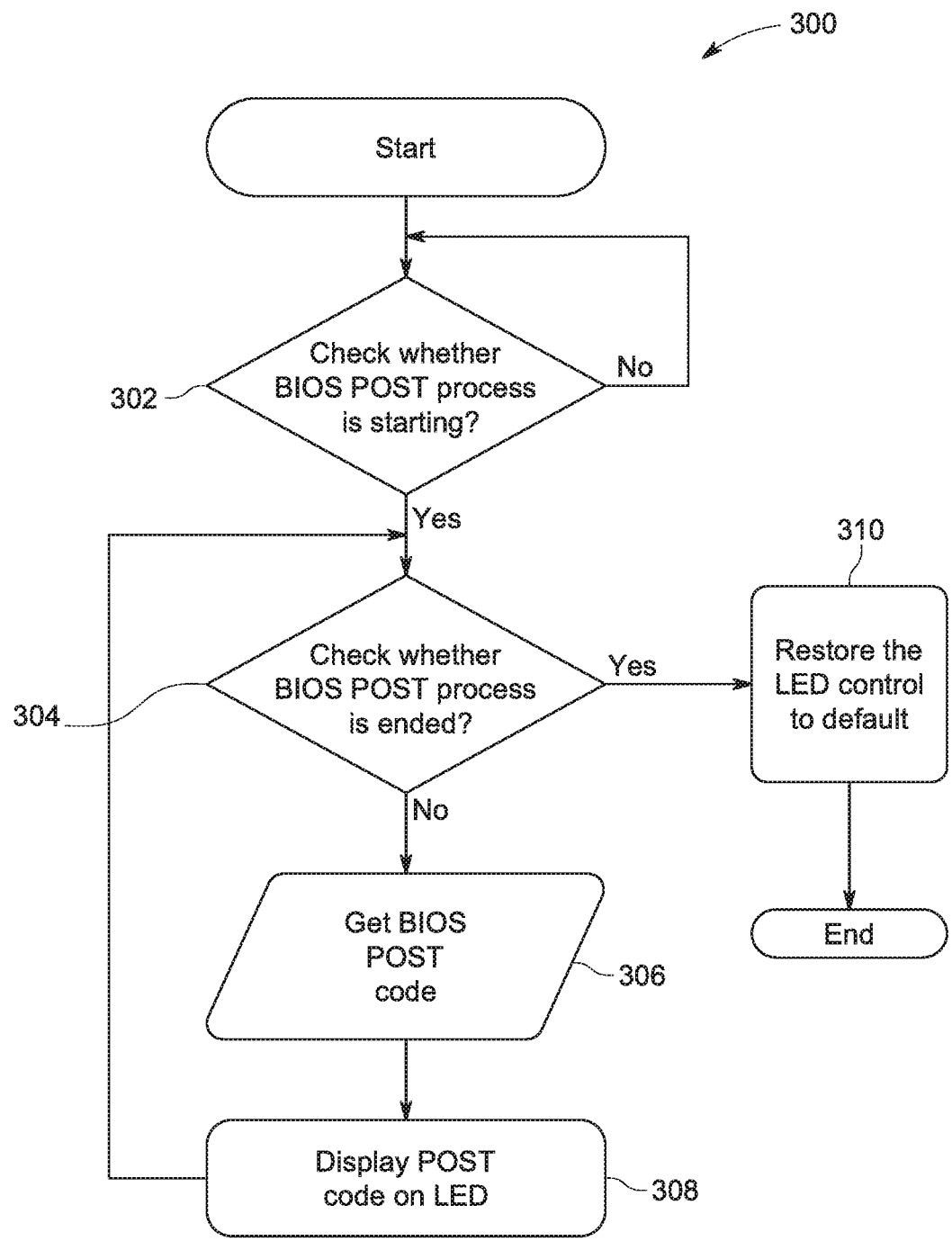
FIG. 3 is a flow diagram of the process of indicating BIOS POST status via LEDs for multiple storage devices, according to certain aspects of the present disclosure.

FIG. 3 is a flow diagram of a process 300 of indicating BIOS POST status via LEDs for multiple storage devices, according to certain aspects of the present disclosure. The flow diagram in FIG. 3 is representative of example machine readable instructions for the process of controlling external LEDs to indicate BIOS POST status. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The BMC (e.g., BMC 210 of FIG. 2) will check the BIOS POST process status (302). The BMC determines whether the POST routine has started. If the POST routine is not started, the process loops back determine whether the POST routine has started (302). If the POST routine has started, the BMC checks whether the BIOS POST process status is ended (304). If the POST routine has started and has not ended, the BMC receives the BIOS POST code from the BIOS chip (306). The BMC then overrides the control of the LEDs from the internal controllers on the storage devices, such as the hard disk drives 120, 122, 124, 126, 128, 130, 132, 134, 136, 138, 140 and 142 of FIG. 1 (308). The BMC then displays the POST code on the LEDs (e.g., LEDs 140, 142, 144, 146, 148, 150, 152, 154, 156, 158, 160, 162, 164 and 166 of FIG. 1) (308). The BMC then loops back and checks the BIOS POST status (304).

If the POST status has ended (304), the routine restores the control of the LEDs on the storage devices to the internal controllers (310). The routine then ends.

Figure 4A:
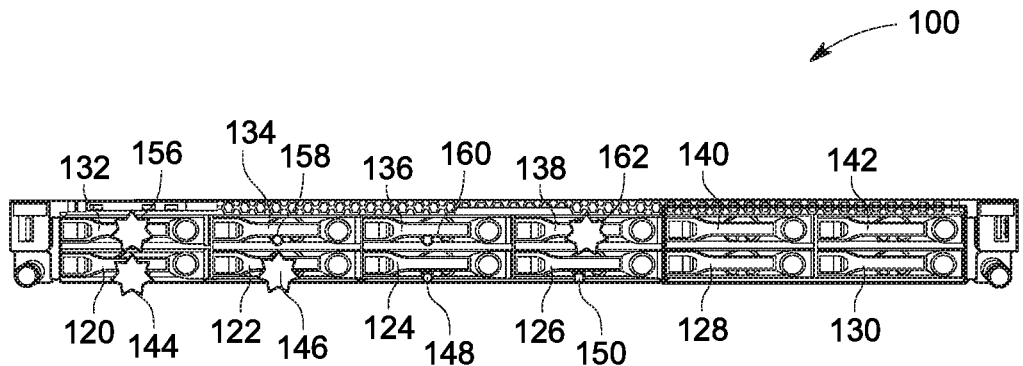
FIG. 4A shows an example sequence of HDD LEDs in the example server that indicate one status of the BIOS POST.

FIG. 4A shows the hard drives 120, 122, 124, 126, 128, 130, 132, 134, 136, 138, 140 and 142 of the server 100 in FIG. 1. FIG. 4A shows an example of the LEDs 144, 146, 148, 150, 156, 158, 160 and 162 displaying a BIOS POST status code received by the BMC 210 from the BIOS chip 200 in FIG. 2. The LEDs 144, 146, 156 and 162 are on, thereby indicating a POST code of 0×9C or 1001 (LEDs 156, 158, 160, and 162) and 1100 (LEDs 144, 146, 148, and 150). The code is 0×9C may indicate a certain condition according to a code table for the server 100

Figure 4B:
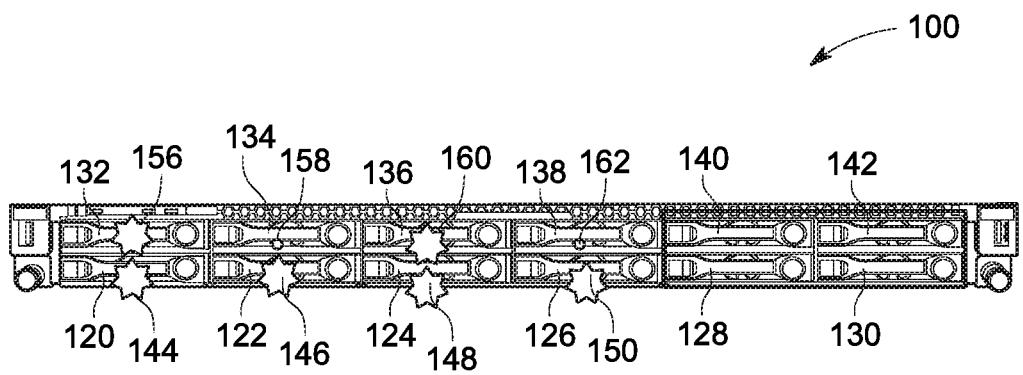
FIG. 4B shows another example sequence of HDD LEDs in the example server that indicate another status of the BIOS POST, according to certain aspects of the present disclosure.

FIG. 4B shows an example of the LEDs 144, 146, 148, 150, 156, 158, 160, and 162 of the server 100 displaying another BIOS POST status code received by the BMC 210 from the BIOS chip 200 in FIG. 2. The LEDs 144, 146, 148, 150, 156 and 160 are on indicating a POST code of 0×AF or 1010 (LEDs 156, 158, 160, and 162) and 1111 (LEDs 144, 146, 148, and 150). The code is 0×AF may indicate a certain condition according to a code table for the server 100.

Figure 4C:
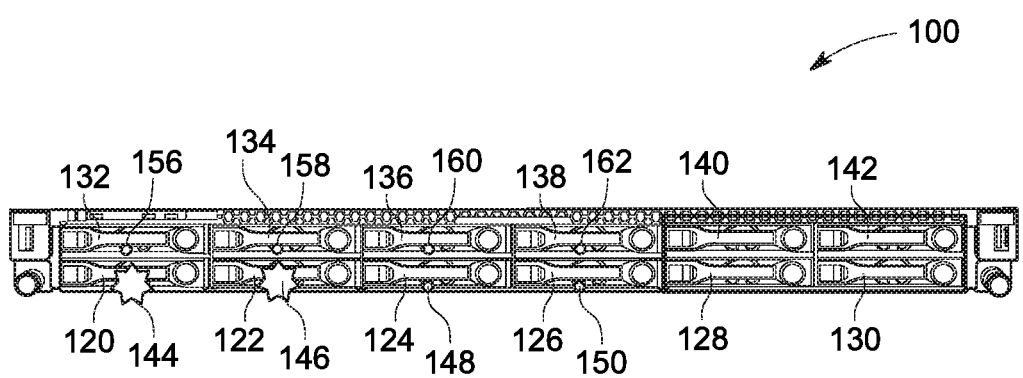
FIG. 4C shows another example sequence of HDD LEDs in the example server that indicate another status of the BIOS POST, according to certain aspects of the present disclosure.

FIG. 4C shows an example of the LEDs 144, 146, 148, 150, 156, 158, 160, and 162 of the server 100 displaying another BIOS POST status code received by the BMC 210 from the BIOS chip 200 in FIG. 2. The LEDs 144 and 146 are on indicating a POST code of 0×0C or 0000 (LEDs 156, 158, 160, and 162) and 1100 (LEDs 144, 146, 148, and 150). The code is 0×0C may indicate a certain condition according to a code table for the server 100.

Although the LEDs of hard disk drives are described above to indicate the status of the POST routine, any modular component that has an indicator visible from the exterior of a server chassis may be used. For example, modular components such as solid state drives (SSD), other storage devices, and network cards with visible indicators may be used. Thus, indicators of other modular components may be controlled by a controller such as a BMC to show the status of the POST routine. Further, a single modular device with a single visible indicator could be used to indicate the status of the BIOS POST routine. Alternatively, multiple visible indicators on a single modular device could be used to indicate the status. One or more indicators could be blinked on and off at different frequencies to show different codes.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for providing a status indicator during a power-on self-test routine, the system comprising:
   a basic input output system operable to execute the power-on self-test routine and output a status of the power-on self-test routine;
   at least one modular device having an internal controller and an externally visible indicator indicating a function of the modular device, the internal controller controlling the externally visible indicator to indicate the function of the modular device; and
   a controller coupled to the basic input output system and the at least one modular device, the controller operable to receive the status from the basic input output system, override the internal controller of the modular device during the power-on self-test routine, control the externally visible indicator of the modular device in response to the status received from the basic input output system, and return control of the externally visible indicator to the internal controller of the modular device when the power-on self-test routine is complete.

2. The system of claim 1, wherein the controller is a baseboard management controller.

3. The system of claim 1, wherein the externally visible indicator is an LED.

4. The system of claim 1, wherein the modular device is one a plurality of modular devices.

5. The system of claim 4, wherein the status is a power on self-test (POST) code.

6. The system of claim 5, wherein the plurality of modular devices comprises eight modular devices, wherein the POST code is an 8-bit code, and wherein the controller is operable to present the POST code using the externally visible indicators of the eight modular devices.

7. The system of claim 6, wherein the POST code is selected from a plurality of codes representing different information associated with the status of the power-on self-test routine.

8. The system of claim 1, wherein the modular device is a storage device.

9. A method of providing a status indicator from a power-on self-test routine executed by a basic input output system on at least one externally visible indicator on a respective modular device, wherein the modular device includes an internal controller controlling the externally visible indicator to indicate a function of the modular device, the method comprising:
- performing the power-on self-test routine via the basic input output system;
- overriding the internal controller of the modular device during the power-on self-test routine
- providing a status of the power-on self-test routine;
- overriding the internal controller of the modular device during the power-on self-test routine,
- controlling the visible indicator of the modular device according to the status of the power-on self-test routine via a controller; and
- returning control of the externally visible indicator to the internal controller of the modular device when the power-on self-test routine is complete.

10. The method of claim 9, wherein the visible indicator is controlled by a baseboard management controller.

11. The method of claim 10, wherein the externally visible indicator is an LED.

12. The method of claim 10, wherein the status is a power-on self-test (POST) code.

13. The method of claim 12, wherein the modular device is one a plurality of modular devices.

14. The method of claim 13, wherein the plurality of modular devices comprises eight modular devices, wherein the POST code is an 8-bit code, and wherein the controller is operable to present the POST code using the externally visible indicators of the eight modular devices.

15. The method of claim 12, wherein the POST code is selected from a plurality of codes representing different information associated with the status of the power-on self-test routine.

16. The method of claim 9, wherein the modular device is a storage device.

17. A server comprising:
- a chassis having an external panel;
- a basic input output system operable to execute the power-on self-test routine and output a code associated with the status of the power-on self-test routine;
- a plurality of slots, each of the slots operable to hold a modular device, each modular device having an internal controller and an externally visible indicator indicating a function of the modular device, the internal controller controlling the externally visible indicator to indicate the function of the modular device; and
- a controller coupled to the basic input output system, the controller operable to receive the code from the basic input output system, override the internal controller of the modular devices during the power-on self-test routine, control the externally visible indicators of the modular devices in response to the code received from the basic input output system, and return control of the externally visible indicators to the internal controllers of the modular devices when the power-on self-test routine is complete.

18. The server of claim 17, wherein the modular devices are storage devices.

* * * * *